United States Patent [19]

Bree

[11] Patent Number: 4,935,993
[45] Date of Patent: Jun. 26, 1990

[54] JAM CLEAT

[76] Inventor: Charles C. Bree, 35 King Street, Whangarei, New Zealand

[21] Appl. No.: 282,252

[22] Filed: Dec. 9, 1988

[51] Int. Cl.⁵ .............................................. F16G 11/00
[52] U.S. Cl. ............................... 24/136 A; 24/136 R; 24/115 M; 403/314
[58] Field of Search ............ 24/136 R, 115 L, 115 M, 24/127, 132 WL, 134, 134 L, 136 K, 136 L, 136 A; 403/314, 374, 409.1

[56] References Cited

U.S. PATENT DOCUMENTS

| | | | |
|---|---|---|---|
| 1,832,388 | 11/1931 | Heisser . | |
| 1,924,438 | 8/1933 | Kemper et al. . | |
| 1,931,346 | 10/1933 | Fries et al. | 24/136 A |
| 2,281,835 | 5/1942 | Dollison | 24/136 R |
| 2,412,097 | 12/1946 | Russel | 24/136 A |
| 2,544,086 | 3/1951 | Herrington | 24/136 A |
| 3,709,071 | 1/1973 | Moransais . | |
| 3,979,797 | 9/1976 | Stember | 24/134 R |
| 3,998,167 | 12/1976 | Van Gompel . | |
| 4,129,927 | 12/1978 | Anderson . | |
| 4,216,568 | 8/1980 | Anderson . | |

FOREIGN PATENT DOCUMENTS 242953 2/1963 Australia .......................... 24/115 M
135041 11/1965 New Zealand .

Primary Examiner—Laurie K. Cranmer
Attorney, Agent, or Firm—Young & Thompson

[57] ABSTRACT

A jam cleat for holding a rope under tension is disclosed. The cleat comprises two converging surfaces between which a roller is located. The rope is inserted between the roller and first of the converging surfaces. When the rope comes under tension friction between the rope and the roller causes the roller to roll along the second converging surface and thereby grip the rope with a wedging action. Devices are disclosed for forcing the roller to release the rope. One such, device is a lever which is optionally pivotably mounted on the cleat. In one example the cleat comprises a base and a body embodying the converging surfaces and the roller and slidably mounted on the base. The body can be moved along the base by the rope as it comes under tension and the base is provided with an abutment which is brought to bear on the roller during this movement and forces the roller to release the rope. A cam provided with a handle is inserted between the body and the base to keep the roller away from the abutment during normal operation of the cleat.

8 Claims, 3 Drawing Sheets

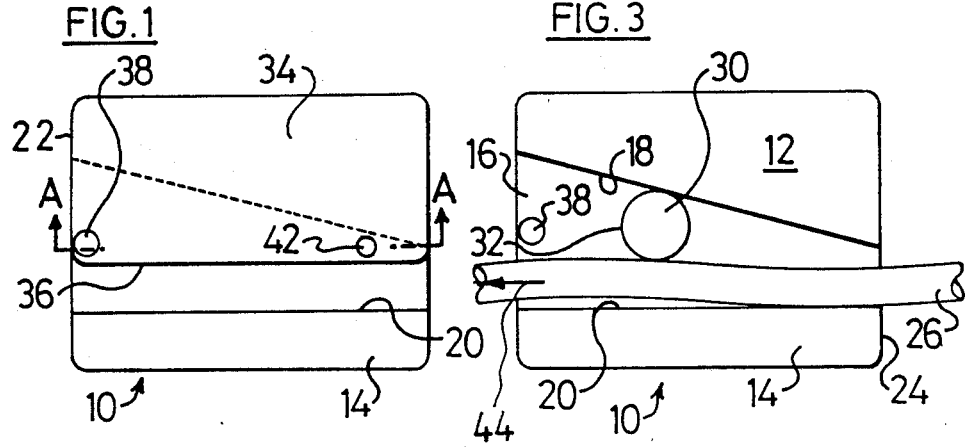

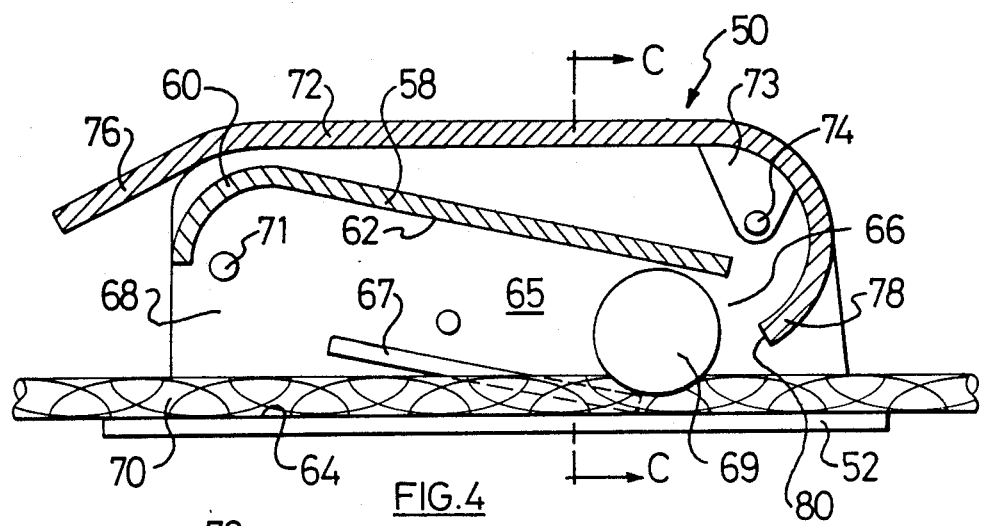
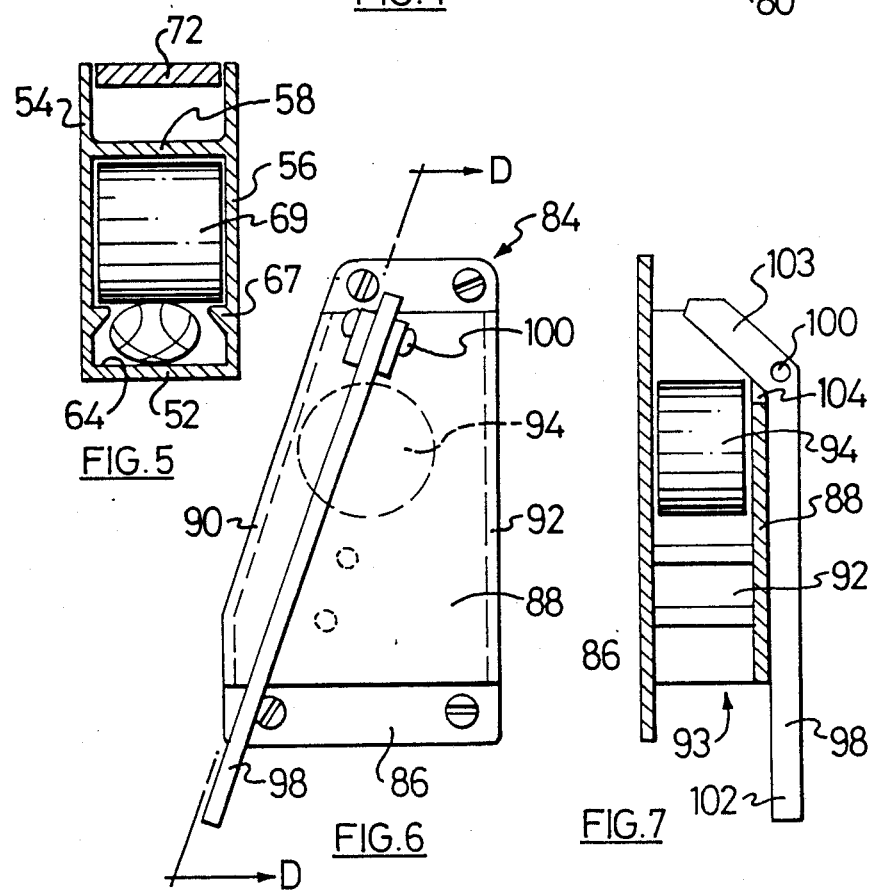

JAM CLEAT

FIELD OF THE INVENTION

This invention relates to a jam cleat.

Jam cleats are widely used nowadays for securing lines such as halyards and sheets on sailing yachts. A jam cleat comprises means for holding a rope by friction with a wedging action and operates on the principle that as the tension on the rope increases so does the wedging action and hence the force of friction by means of which the cleat holds the rope.

BACKGROUND OF THE INVENTION

One known jam cleat comprises a pair of spaced side walls the inner faces of which converge from top to bottom. The inner faces are furthermore fluted, the axes of the flutes being canted from the vertical in the direction in which tension is applied to a rope which will be secured by the cleat. In this manner when the rope is inserted between the walls and tension applied thereto the flutes tend to force the rope downwardly and hence to be gripped more securely between the converging inner faces of the walls.

Another known jam cleat comprises a wedge member which is mounted for pivotal movement adjacent a single wall. The wedge member has a toothed or serrated eccentric outer face which, as the member pivots, moves closer to the inner face of the wall. The rope to be secured is located between the outer face of the wedge member and the inner face of the wall and the wedge member is pivoted, usually by means of a handle provided for the purpose, until the rope is gripped by friction between the two said faces.

In New Zealand patent #135041 there is shown a jam cleat having a pair of blocks with converging inner faces and a gear mounted therebetween and having teeth which mesh with teeth formed in the inner face of one of the blocks. The gear is held in position by means of a spring mounted on the block with the toothed face and, while being free to float to a limited extent in relation to its joint with the spring, nevertheless is required to remain in mesh with the teeth on the one block for the proper operation of the jam cleat.

Jam cleats of these latter two kinds are not, as far as the applicant is aware, designed for heavy work. They are insufficiently robust for heavy work and furthermore if excessive tension is applied to the rope the wedge member might be pulled so tightly against the rope that it could not be released.

OBJECT OF THE INVENTION

It is an object of the invention to provide a jam cleat of novel design.

SUMMARY OF THE INVENTION

According to the invention there is provided a jam cleat comprising first and second converging faces with a space therebetween through which a rope inserted in the cleat can pass, the space having a narrow end at which the faces are close together and a wide end at which the faces are further apart, a jamming member locatable in the space so as to be movable therein towards the narrow end while remaining in contact with the first face thereby to move closer to the second face and thus to cause the rope to be jammed between the jamming member and the second face when tension is applied to the rope tending to move the rope through the space from the wide end to the narrow end, and release means which can be actuated to allow the jamming member to move away from the second face and release the rope.

In one form of the invention the release means comprises a lever which is arranged to bear on the jamming member to apply a force thereto and release the rope.

According to one aspect of the invention the lever is provided with a mounting at which it is pivotally mounted on the cleat, the lever being arranged to bear on the jamming member at a location on one side of the mounting and to be gripped by the hand at a location on an opposite side of the mounting and pivoted to bear on the jamming member.

Advantageously, according to the invention, the location at which the lever is arranged to bear on the jamming member is at one end of the lever and the location at which the lever is arranged to be gripped is further away from the mounting than the said location at the one end.

In one form of the invention the jam cleat includes a movable component which embodies the first face and which is movable between a working position in which the jamming member is relatively close to the second face so that the rope can be jammed between the jamming member and the second face and a released position in which the jamming member can move further away from the second face and release the rope, the release means comprising retention means to hold the movable component in the working position and prevention means to prevent the jamming member from moving substantially towards the narrow end of the space as the movable component moves from the working position to the released position.

In one form of the invention the retention means comprises an abutment positioned so that the jamming member tends to be drawn by the rope into contact with the abutment when the movable components moves from the working position to the released position.

According to one aspect of the invention the movable component embodies the first face and the second face.

In another aspect the jam cleat includes a fixed component which comprises the abutment, a cam mountable between the fixed component and a cam following surface embodied in the movable component and having an eccentric cam surface arranged when the cam is in a first disposition to bear on the cam following surface and hold the movable component in its working position, and means to move the cam from the first disposition to a second disposition in which the movable component is released from the working position and can be moved under the force of the tension applied by the rope to the released position.

In one form of the invention the eccentric cam surface has a point of maximum throw which bears on the cam following surface as the cam moves from the first disposition to the second disposition.

In one aspect the jamming member is cylindrical roller.

BRIEF DESCRIPTION OF THE DRAWINGS

The invention is further described with reference to the accompanying drawings in which various embodiments are described by way of example only and in which FIG. 1 is a plan view of a first jam cleat;

FIG. 2 is a cross sectional view on arrows A-A in FIG. 1;

FIG. 3 is a cross sectional view on arrows B-B in FIG. 2;

FIG. 4 is a cross sectional view similar to FIG. 3 of a second jam cleat;

FIG. 5 is a cross sectional view on arrows C-C in FIG. 4;

FIG. 6 is a plan view of a third jam cleat;

FIG. 7 is a cross sectional view on arrows D-D in FIG. 6;

DETAILED DESCRIPTION OF THE EMBODIMENTS ILLUSTRATED IN THE DRAWINGS

Figure 8:
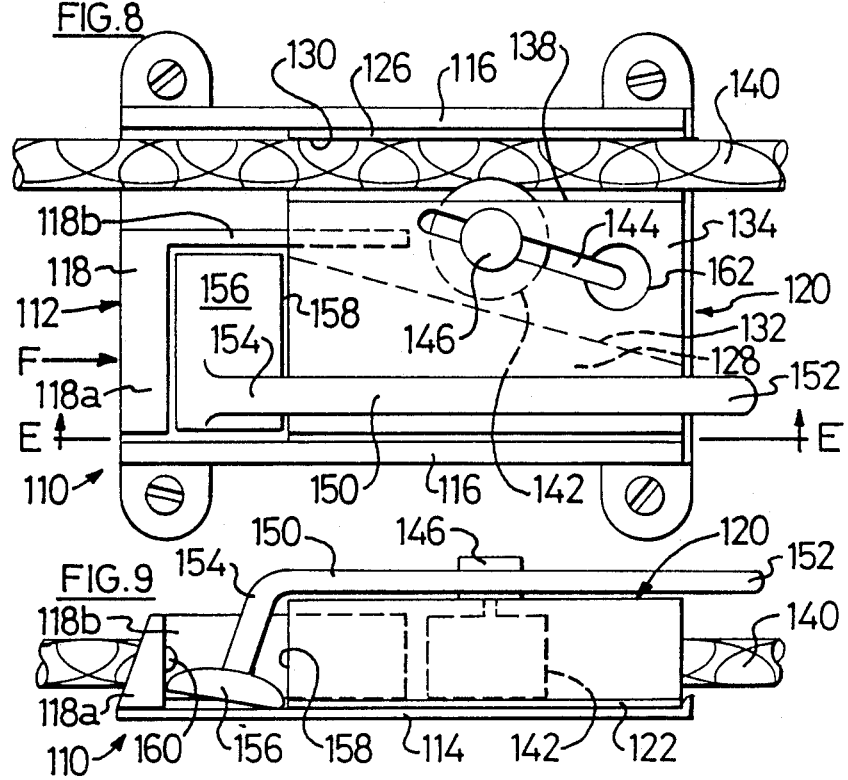
FIG. 8 is plan view of a fourth jam cleat.

In FIGS. 1 to 3 a jam cleat 10 of simple construction comprises two blocks 12, 14 mounted on a base 16 having respective planar inner faces 18, 20 arising therefrom. The planes in which the faces 18, 20 lie are disposed at an angle of about 20 degrees one to the other so that the faces converge from one end 22 of the jam cleat to the other end 24. At the end 24 the faces are nevertheless still sufficiently far apart that a rope 26 can be inserted easily therebetween. The faces are smooth; i.e. they need not be provided with clearly defined projections in the nature of teeth for gripping the rope although they may have stippled or matt or at least unpolished surfaces.

A roller 30 is located between the inner faces 18, 20. The roller has a cylindrical outer face 32 which may also be also smooth. The diameter of the roller is greater than the space between the inner faces 18, 20 of the blocks 12, 14 at the end 24 so that even when there is no rope between the faces it is not possible for the roller to pass between the inner faces at that end 24 since it comes into abutment therewith. A plate 34 is mounted on the upper face of the block 12. This plate overlaps the inner face 18 of the block 12. The plate has an edge 36 which projects towards and is parallel to the inner face 20 of the block 14. However there is sufficient space left to allow the rope 26 to pass therebetween. A rivet or similar fastening 38 located adjacent the end 22 and about halfway between the inner faces 18, 20 of the blocks at that end joins the plate 34 to the base 16. The rivet serves to support the plate 34 and at the same time to act as an abutment to prevent passage of the roller therepast. The axial length of height of the roller is marginally less than the height of the face 18 so that the roller can slide freely in the space between the plate 34 and the base 16. In fact the roller is held captive in the space between the inner faces of the blocks by the above described arrangement.

In use the rope is inserted through the gap between the edge 36 of the plate and the inner face 20 of the block 16. If the roller is in the way of the rope it may be moved aside by pulling the rope in the direction of the arrow 44 while causing it to bear on the upper face of the roller. In ordinary circumstances the rope will be under tension from the opposite direction and, once it is located between the outer face of the roller and the inner face 20 of the block 16 it will, if it is released, draw the roller by friction towards the end 24 of the cleat and thus into a situation in which the rope is wedged between the roller and the face 20.

Because the roller is able to move freely along the face 18 it is able to increase its wedging force without hindrance once the rope has begun to be squeezed between the outer face of the roller and the inner face 20 of the block 14. It does not need the additional frictional force which would be created by the provision of teeth.

To free the rope, either it is jerked backwardly in a direction opposite the direction in which tension is applied or else the roller may be freed by means of a lever 40 the lower end of which is inserted through the aperture 42 in the plate and brought to bear on the roller using the periphery of the aperture as a fulcrum.

Any suitable number of one or more jam cleats may be provided by mounting a series of blocks on a single base, each block between the end blocks providing two inner face, one for one cleat and the other for an adjacent cleat.

The cleat 50 shown in FIG. 4 and 5 comprises a base 52 with spaced parallel upstanding side walls 54 and 56. A cross wall 58 located above the base spans the side walls. The cross wall comprises a plate which is flat for most of its length but curves downwardly at its rear end as shown at 60. The cross wall slopes downwardly towards the base at an angle of about 20 degrees. The cross wall thus has an lower face 62 which converges towards the upper face 64 of the base. There is thus a space 65 between the faces 62 and 64 which is narrow at the forward end of the flat portion of the cross wall and wider at the rear end thereof. A gap 66 is left between the base and the end of the cross wall at the forward end thereof. Similarly a gap 68 is left between the rear end of the cross wall and the base. These gaps admit a rope 70 which can be passed through the space 65.

A rib or track 67 is formed in the inner face of each side wall 54, 56. The tracks 67 are parallel to the flat portion of the lower face of the cross wall. A cylindrical roller 69 runs on the tracks, being a free rolling fit in that part of the space 65 above the tracks. There is a clearance between the tracks sufficient to ensure that the passage of the rope through the space 65 is not impeded by the track.

One or more pins 71 may be mounted between the side walls 54, 56 serving to limit the travel of the roller in the space 65.

In the cleat 50 the roller 69 tends to roll under gravity towards the forward end of the space and into contact with the rope. Once the roller is in contact with the rope any movement of the rope in a forward direction through the cleat will cause the roller to jam itself tight against the rope and thus prevent further forward movement thereof.

Since the roller will tend always to roll forward into contact with the rope it is important that means be provided to prevent this contact when the rope is to be released. Such means is provided by the lever 72. The lever is provided with a bracket 73 through which it is pivoted to the cleat by means of a pivot pin 74 fixed to the side walls 54, 56. The rear end 76 of the lever constitutes a handle by means of which the lever can be gripped by the hand and pivoted upwardly. The forward end 78 of the lever is curved downwardly and back on itself through an angle of about 135°. The extremity 80 of the forward end 78 is located below the forward end of the cross wall and immediately in front of the roller 69 when the roller has reached the forward limit of its travel. When the handle of the lever is pivoted upwardly the forward extremity 80 thus pivots rearwardly into contact with the roller and forces the roller to move backwardly along the tracks. This action serves to hold the roller clear of the rope when the rope is to be released. Furthermore the bracket 73 is located much closer to the forward end of the lever than the rear end so that the lever provides a substantial mechanical advantage in assisting the user to release the roller from its jamming engagement with the rope.

The jam cleat 84 shown in FIGS. 6 and 7 is somewhat similar to the cleat 50. The cleat 84 comprises a base 86 and a top plate 88 spaced from each other by side plates 90 and 92 which converge towards the forward end of the cleat, defining a space 93 in which a cylindrical roller 94 is held capacitive. A rope (not shown) can pass through the space 93 and can be jammed therein between the roller and the inner wall of the side plate 92 when the roller is moved to the forward end of the cleat. This forward movement may be assisted by providing the roller with a coaxially located pin which passes through a slot formed in the top plate 88 and extending parallel to the side plate 90. The pin may be provided with a handle and may be gripped by the hand to push the roller in the forward direction. The pin, slot and handle are not shown in FIGS. 6 and 7 but a similar arrangement is illustrated in the cleat shown in FIGS. 8 to 10. A lever 98 is pivoted to the cleat by means of a pivot pin 100. The lever has a rear end 102 constituting a handle and a downwardly cranked forward end 103 which passes through a slot 104 in the top plate 88. The extremity of the forward end bears on the roller to drive it rearwardly when the handle is pivoted upwardly, thereby to release the rope.

Figure 9:
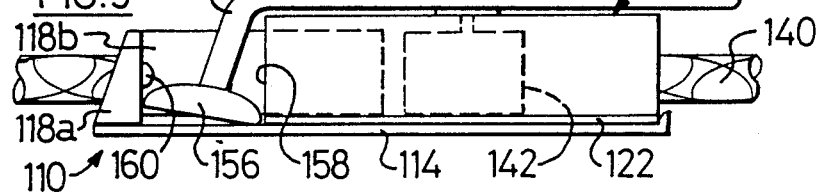
FIG. 9 is a cross sectional view on arrows E-E in FIG. 8.
Figure 10:
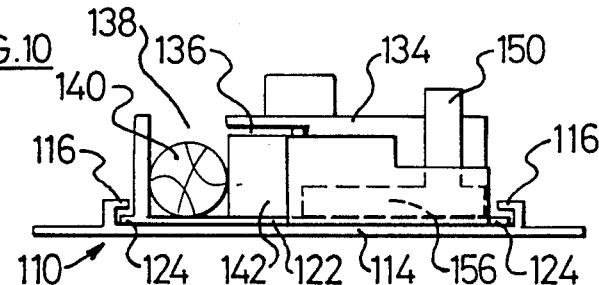
FIG. 10 is an end elevation (on arrow F in FIG. 8) of the fourth jam cleat

The jam cleat 110 shown in FIGS. 8 to 10 is primarily intended for heavy duty work where it may be difficult or impossible release the roller by hand even with the assistance of a lever. The cleat 110 is comprised of two parts. The first part 112 is mounted in fixed position on a suitable mounting such as the deck of a sailing yacht. The part 112 comprises a rectangular base plate 114 having inturned flanges 116 arising from each of its long sides. Also fixed to the part 112 is a stout L-shaped abutment plate 118 one portion 118a of which is disposed across the forward end of the base plate 114 and the other part 118b of which projects rearwardly from the forward end of the base plate 112.

The second part 120 comprises a rectangular base plate 122 the long edges 124 of which are located under the inturned flanges 116 of the first part so that the part 120 is a snug sliding fit between the flanges 116. Set in from the long edges 124 of the base plate 122 are two side walls 126 and 128 which respectively have inner faces 130 and 132 which converge towards the forward end of the cleat. A top plate 134 is mounted on the side wall 128. The top plate projects towards the side wall 126, partially overlying the space 136 between the walls and defining a slot 138 through which a rope 140 can be inserted in the space. A cylindrical roller 142 is located in the space. The roller is provided with a coaxially disposed pin which projects through a slot 144 in the top plate 134. The slot 144 extends parallel to the inner face 132 of the side wall 128. A handle 146 is mounted on the aforementioned pin. By this means not only is the roller held captive in the space 136 but also, by manipulating the handle, the roller can be moved towards the forward end of the cleat.

The cleat 110 is provided with a lever 150. The lever 150 has a rear part 152 constituting a handle and a downwardly cranked forward part 154 the extremity of which is formed as a wide cam 156. The cam is inserted between the front face 158 of the side wall 128 and the portion 118a of the abutment plate. The cam is retained in that position (being effectively mounted on the part 112) by means of a dimple 160 formed in the rear face of portion 118a. When the rear part 152 of the lever is disposed flat aganist the top plate 134 the position of the cam is such as to keep the sliding part 120 of the cleat in a working position at the rear of the fixed part 112. In this position a rope can be inserted in the cleat and jammed therein by sliding the roller forward. The rearwardly projecting part 118b of the abutment plate is positioned so that it projects into the front portion of the space 136 and so that when the sliding part 120 is in the working position it is not possible for the roller to come into contact with the part 118b. However when the handle of the lever is raised the sliding part is released from its working position and the tension in the rope draws the whole sliding part 120 forwardly so that the roller comes into abutment with the part 118b of the abutment plate. The force applied by the rope is sufficient to overcome the friction between the roller and the rope and the roller is forced backwardly relative to the sliding part as the sliding part continues to move forward. The release of the rope is thus assisted by the tension in the rope.

In an alternative construction the cam could be hinged or otherwise pivotably mounted on the portion 118a or the sliding part 120. In the latter case the cam surface would be in sliding contact with the rear face of the portion 118a. The cam arrangement could be replaced by various alternative such as overcentre toggle or lever arrangement.

It is not essential that both faces 130 and 132 be embodied in the sliding part 120. The face 130 could be embodied in the fixed part 112. In such a construction the sliding part 120 would not necessarily need to slide in a direction parallel to the rope. It could for example slide perpendicularly thereto and still allow the roller to release the rope.

It may be noted that the lever is moved back to the position which it occupies when holding the sliding part in its working position the cam moves through an overcentre position and the force of the sliding part applied thereto under the tension of the rope tends to retain the lever in this position. Although not shown in the drawings it is clear that the dimple 160 could be formed in the face 158 so that the cam would then ride over the inner face of the plate 118 which would thus become the cam following surface. Alternatively the lever could be pivotably mounted on either the fixed part 112 or the movable part 120 of the cleat.

It may also be noted that the slot 144 is provided with an enlargement 162 at its rear end. The handle 146 can be received in this enlargement to lock the roller in position at the rear of the slot. A spring mounted between the handle and its carrying pin may urge the handle into the enlargement.

Although the jamming members illustrated in the examples are rollers jamming members of other shapes could be used. In one example the jamming member could be wedge shaped, its outer faces converging at the same angle as the converging faces of the cleat so that the face of the jamming member which contacts the rope is parallel thereto. In another example the jamming member could have one flat faces in sliding contact with the any of the faces 18, 62 or 132 in the cleats illustrated, and a curved face in contact with the rope. In both of these alternative examples rope wear may be reduced and the holding force on the rope increased as a result of an increased area of contact with the jamming member.

It is not intended that the scope of a patent granted in pursuance of the application of which this specification forms a part should exclude modification and/or improvements to the embodiments described and/or illustrated which are within the spirit of the invention as defined in the claims or be limited by details of such embodiments further than is necessary to distinguish the invention from the prior art.

I claim:

1. A jam cleat comprising a body provided with mounting means for mounting the body on a support surface, the body comprising first and second converging faces with a space therebetween through which a rope inserted in the cleat can pass, the space having a narrow end at which the faces are close together and a wide end at which the faces are further apart, and a jamming roller with a cylindrical working surface on which the jamming rolling rolls along the first face towards the narrow end of said space thereby to move closer to the second face and thus to cause the rope to be jammed between the working surface and the second face when tension is applied to the rope tending to move the rope through the space from the wide end to the narrow end, the working surface and the first face being of substantially equal width and the working surface being in contact with the first face across the entire said width, and a release device mounted on the body and arranged when actuated to bear on the jamming roller and apply a force thereto to cause it to move towards the wide end and release the rope.

2. A jam cleat according to claim 1, in which the release device comprises a lever which is arranged to bear on the jamming roller to apply said force thereto and release the rope.

3. A jam cleat according to claim 2, in which the lever is provided with a mounting at which it is pivotably mounted on the body, the lever being arranged to bear on the jamming roller at a location on one side of the mounting and to be gripped by the hand at a location on an opposite side of the mounting and pivoted to bear on the jamming roller.

4. A jam cleat according to claim 3, in which the location at which the lever is arranged to bear on the jamming roller is at one end of the lever and the location at which the lever is arranged to be gripped is further away from the mounting than the said location at the one end.

5. A jam cleat according to claim 1, including a movable component which embodies the first face and which is movably mounted on the body between a working position and a release position, the jamming roller being in the working position relatively close to the narrow end so that the rope can be jammed between the jamming roller and the second face, the release device comprising an abutment fixed in a position on the body such that when the movable component moves from the working position to the release position the abutment bears on the jamming roller to cause it to move towards the wide end and release the rope.

6. A jam cleat according to claim 5, in which the movable component is mounted on the body so as to be movable by tension applied to the rope from the working position to the release position.

7. A jam cleat according to claim 5, in which the movable component comprises the first face and the second face.

8. A jam cleat according to claim 5, including a fixed component which comprises the abutment, a cam mountable between the fixed component and a cam following surface embodied in the movable component and having an eccentric cam surface arranged when the cam is in a first disposition to bear on the cam following surface and hold the movable component in its working position, and means to move the cam from the first disposition to a second disposition in which the movable component is released from the working position and can be moved under the force of the tension applied by the rope to the released position.

* * * * *